United States Patent [19]
Bernard

[11] 4,015,718
[45] Apr. 5, 1977

[54] BICYCLE STORAGE RACK
[76] Inventor: Walter Bernard, 4800 S. Lake Park Ave., Chicago, Ill. 60615
[22] Filed: June 4, 1976
[21] Appl. No.: 692,964

Related U.S. Application Data
[63] Continuation of Ser. No. 567,559, April 14, 1975, now abandoned.

[52] U.S. Cl. .......................... 70/235; 211/20, 22
[58] Int. Cl.² .................. B62H 3/08, B62H 5/00
[58] Field of Search .......... 70/226, 227, 233–236; 211/5, 17–22

[56] References Cited
UNITED STATES PATENTS

| | | | |
|---|---|---|---|
| 3,861,533 | 1/1975 | Radek | 211/20 |
| 1,060,649 | 5/1913 | Tobin | 70/235 X |
| 3,883,002 | 5/1975 | Moore | 211/18 |
| 639,991 | 12/1899 | Jewell | 211/19 |
| 3,788,109 | 1/1974 | Lane | 211/5 X |
| 3,863,767 | 2/1975 | Garwood | 211/5 |
| 3,805,564 | 4/1974 | Velardo | 70/233 X |
| 607,024 | 7/1898 | Durfee et al. | 211/18 |
| 3,581,962 | 6/1971 | Osborn | 211/22 X |
| 3,762,569 | 10/1973 | Spring | 211/5 |
| 611,856 | 10/1898 | Brown et al. | 211/20 |

FOREIGN PATENTS OR APPLICATIONS

| | | | |
|---|---|---|---|
| 28,772 | 11/1897 | Great Britain | 211/22 |
| 516,858 | 1/1953 | Belgium | 211/20 |
| 444,898 | 7/1925 | Germany | 211/22 |
| 296,892 | 9/1928 | Great Britain | 211/21 |
| 360,163 | 11/1931 | Great Britain | 211/22 |
| 531,326 | 3/1927 | Germany | 211/17 |
| 787,485 | 6/1943 | Germany | 211/22 |
| 234,593 | 6/1925 | Great Britain | 211/18 |
| 1,118,714 | 3/1956 | France | 211/17 |
| 151,000 | 4/1953 | Australia | 211/22 |

*Primary Examiner* — Roy D. Frazier
*Assistant Examiner* — Thomas J. Holko
*Attorney, Agent, or Firm* — Howard Olevsky

[57] ABSTRACT

The bicycle storage rack includes a plurality of channel members situated in a framework and arranged in an upper array and a lower array. In each array the channel members are parallel spaced and the ends of the members disposed along one side of the framework are vertically staggered so that the handle grips of a bicycle received on one channel member will be disposed above or below the handle grips of adjacent bicycles thereby allowing for a close spacing between channel members. Each channel member includes a first generally horizontally disposed segment, a second segment extending upwardly from one end of the first segment and a third segment which extends angularly upwardly from the second segment and over the first segment thereby defining a concave trough formation. A pair of bars extend between the first and third segments and together with the concave trough formation of the segments define a front wheel receiving and retaining formation. A pair of plates extend upwardly from the first segment on either side of the channel member in position to straddle the rear wheel of a bicycle received thereon. Each of the plates has a plurality of holes therein aligned with holes in the other plate and arranged to receive a padlock therethrough for locking the rear wheel of the bicycle to the channel member. A locking strap can be pivotally mounted at one end to the first segment and can have holes therein near the free end thereof for securing a padlock to the strap adjacent to or about a portion of the rear wheel or the frame of the bicycle.

9 Claims, 1 Drawing Figure

BICYCLE STORAGE RACK

This is a continuation of application Serial No. 567,559, filed April 14, 1970, now abandoned.

BACKGROUND OF THE INVENTION

The present invention relates to a bicycle storage rack and more specifically to a bicycle storage rack constructed and designed to hold in a secure manner a larger number of bicycles within a relatively small framework suitable for installation in an apartment building, an office building or the like.

In recent years there has been a significant increase in bicycle ownership and use, particularly in high rise building areas within the cities of many countries. With many apartment dwellers in high rise apartment buildings now owning bicycles, landlords are faced with the problem of providing storage space for these bicycles. Also the bicycle owners are concerned that the storage area be safe and secure, since the theft of bicycles from presently designed storage areas is becoming more and more frequent.

Heretofore, when bicycles were not as popular as they are today, there was not a great need for a compact, safe and secure storage area in high rise buildings; and bicycle racks were designed primarily for securely mounting bicycles to, and carrying the bicycles on, a vehicle such as an automobile.

Also previously proposed bicycle storage or parking structures were not concerned with the space limitations found in high rise buildings or with the problem of determined bicycle thieves with heavy duty bolt cutters easily capable of cutting through most bicycle chains.

Examples of previously proposed bicycle racks, supports, carriers, parking structures and locking structures can be found in the following United States Patents:

| | |
|---|---|
| 698,277 | 3,591,029 |
| 2,357,504 | 3,675,833 |
| 2,803,349 | 3,720,333 |
| 3,176,903 | 3,749,295 |
| 3,581,962 | 3,762,569 |

The present invention differs from the previously proposed bicycle racks, supports, carriers, parking structures and locking structures by providing a compact, safe and secure bicycle storage rack including a plurality of substantially identical novel bicycle receiving channel members each of which envelops part of a bicycle received and locked therein, thereby greatly inhibiting, if not altogether preventing, theft of the bicycle from the storage rack.

SUMMARY OF THE INVENTION

According to the invention there is provided a bicycle storage rack comprising at least one bicycle receiving channel member including a first, elongate, generally horizontally disposed, segment, a second generally upright segment extending upwardly from one end of said first segment, and a third segment extending angularly upwardly from the upper end of said second segment and above said first segment, said segments being arranged so as to form between the ends thereof a continuous bicycle wheel receiving trough which extends generally horizontally, then upwardly and finally in a reverse direction over a portion of the generally horizontally disposed section of the trough, said trough being adapted to receive bicycle wheels therein with a portion of said first segment adjacent said one end of said first segment together with said second segment and said third segment forming a bicycle wheel receiving and retaining formation, and said channel member further includes securing means for securing a bicycle to said channel member with said third segment extending above a portion of one wheel of the bicycle.

DESCRIPTION OF THE PREFERRED EMBODIMENTS

Figure 1:
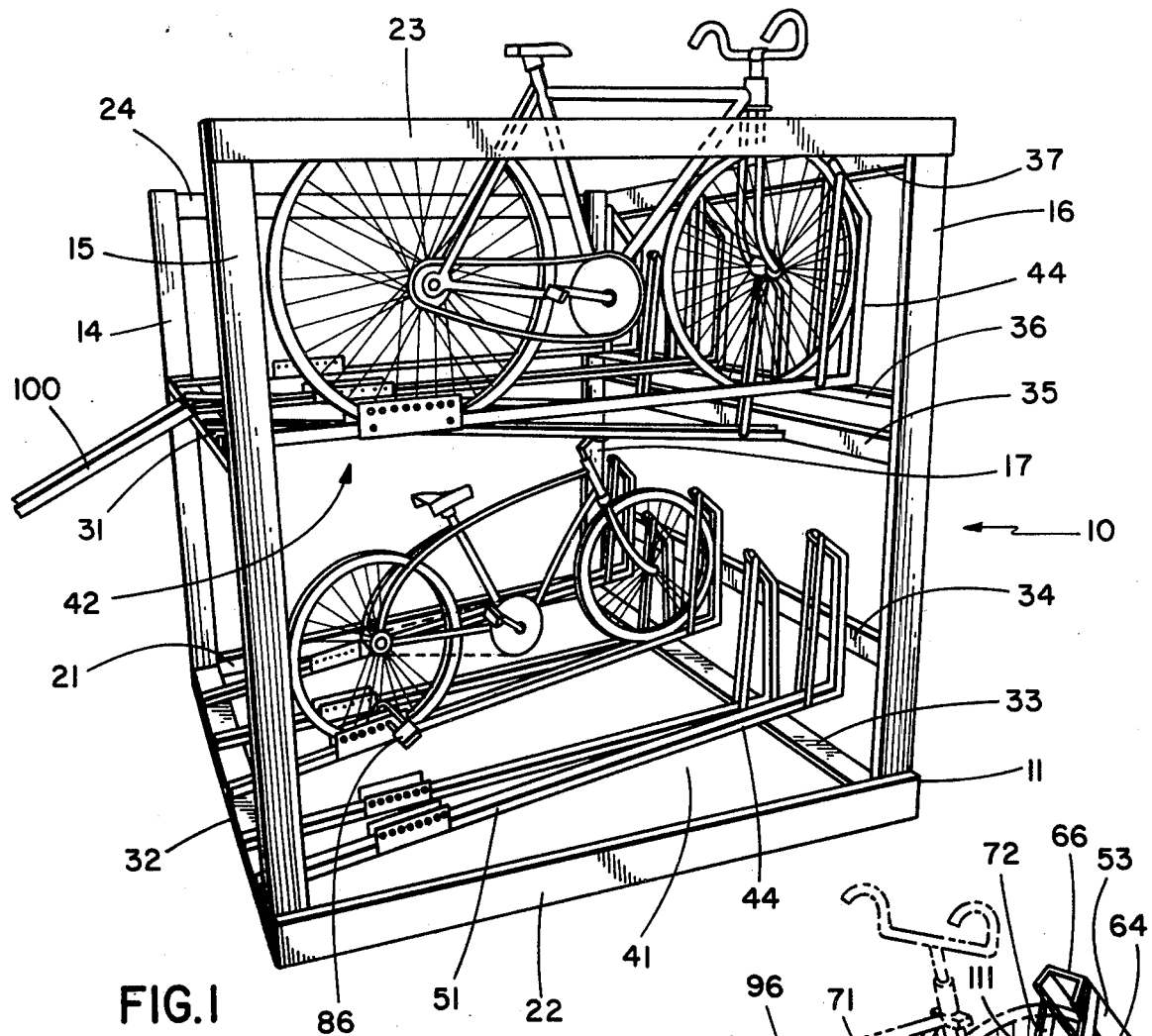
FIG. 1 is an elevational perspective view of the bicycle storage rack.

The bicycle storage rack is shown in FIG. 1 and is generally identified by the reference numeral 10. The rack 10 includes a generally box-shaped framework 11 having upright members 14–16, lateral cross members 21–24 and transverse cross members 31–37. Within the framework 11 are mounted two arrays 41 and 42 of bicycle receiving channel members 44. In the illustrated embodiment, the first or lower array 41 includes five generally parallel spaced channel members 44 each extending between transverse cross member 32 and either transverse cross member 33 or transverse cross member 34. Likewise the upper array 42 includes five generally parallel spaced channel members 44 each extending between transverse cross member 31 and either transverse cross member 35 or traverse cross member 36. As will be explained in greater detail hereinafter, the ends of alternate channel members 44 juxtaposed the cross members 34 and 36 are higher than the ends of adjacent channel members 44 juxtaposed the cross members 33 and 35, such that these ends of the channel members 44 (the ends on the right hand side of FIG. 1) can be referred to as vertically staggered.

With this arrangement, the handle grips of a bicycle received on one channel member 44 will be above or below the handle grips of the bicycles on the adjacent channel members 44 thereby permitting a close spacing of the channel members 44. In a prototype built, a spacing of one foot between channel members, and between the upright members and the adjacent channel member, a spacing of 6 inches was provided. The staggered ends of the channel members were vertically offset or staggered a distance of nine inches relative to the adjacent ends. And the rack was generally cubical in shape being approximately six feet on each side.

Since the channel members 44 are substantially identical to each other, only one of them will be described in detail in connection with the description of FIG. 2. As shown the channel member 44 is made from three segments 51, 52, 53 of channel iron or other metal having a generally U-shaped or trough-shaped cross section. The first segment 51 is elongate, is mounted generally horizontally in the rack 10, and has a bottom wall 54 on which the bicycle wheels rest and side walls 56 and 58 which confine the bicycle wheels on the channel member 44 and prevent lateral movement thereof. One end 60 of the segment 51 is unobstructed or open to permit bicycle wheels to be rolled onto the first segment 51. The other end 62 is closed off by the second segment 52 which is secured to and extends generally upwardly from the end 62 of the first segment 51 a distance less than the diameter of the wheels of a conventional man's or woman's bicycle. The third segment 53 is secured at one end 64 thereof to the upper end of the second segment 52 and extends angularly upwardly above the first segment 51, generally toward the one end 60 of the first segment 51. The segments 51-53 interconnected in the manner just described above provide the channel member with a generally J shape and a continuous bicycle wheel receiving trough which extends between the end 60 of the first segment 51 and the distal or free end of the third segment 53 generally identified by the reference numeral 66. Also it will be noted that the third segment 53 is arranged to extend above a portion of a bicycle front wheel. In this way the third segment 53, the second segment 52, and a portion of the first segment 51 adjacent the end 62, i.e., the hook portion or concave trough portion of the J shaped channel member 44, form a bicycle wheel receiving and retaining formation 70. Typically the wheel retained is the front wheel although a bicycle can be rolled forwards or backwards onto the channel member such that either wheel can be received and retained in the formation 70.

In the illustrated embodiment, the wheel retaining formation 70 is further defined by a pair of straps or bars 71 and 72 which extend between and are fixed to the first segment 51 and third segment 53. The bars 71, 72 are spaced from the second segment 52 and are situated, respectively, on either side of the continuous trough so as to straddle a wheel received in the formation 70 and thereby more securely confine or envelop the wheel.

For the purpose of securing and locking a bicycle to the channel member 44 a pair of plates 81 and 82 are secured to and extend above the side walls 56 and 58 of the first segment 51 so as to be in position to straddle the other, e.g., the rear, wheel of the bicycle. Each plate 81, 82 has a plurality of holes 84 therein aligned with the holes in the other plate. Each pair of aligned holes 84 is adapted to receive the leg of a padlock 86 therethrough as shown in FIG. 1 for locking the bicycle to the channel member 44. Note that the padlock 86 locked to the plates 81 and 82 and the second segment 52 together serve to prevent forward or backward movement of the bicycle while the padlock 86 locked to the plates 81 and 82 and the third segment 53 together serve to prevent lifting of the bicycle off of the channel member 44.

Figure 2:
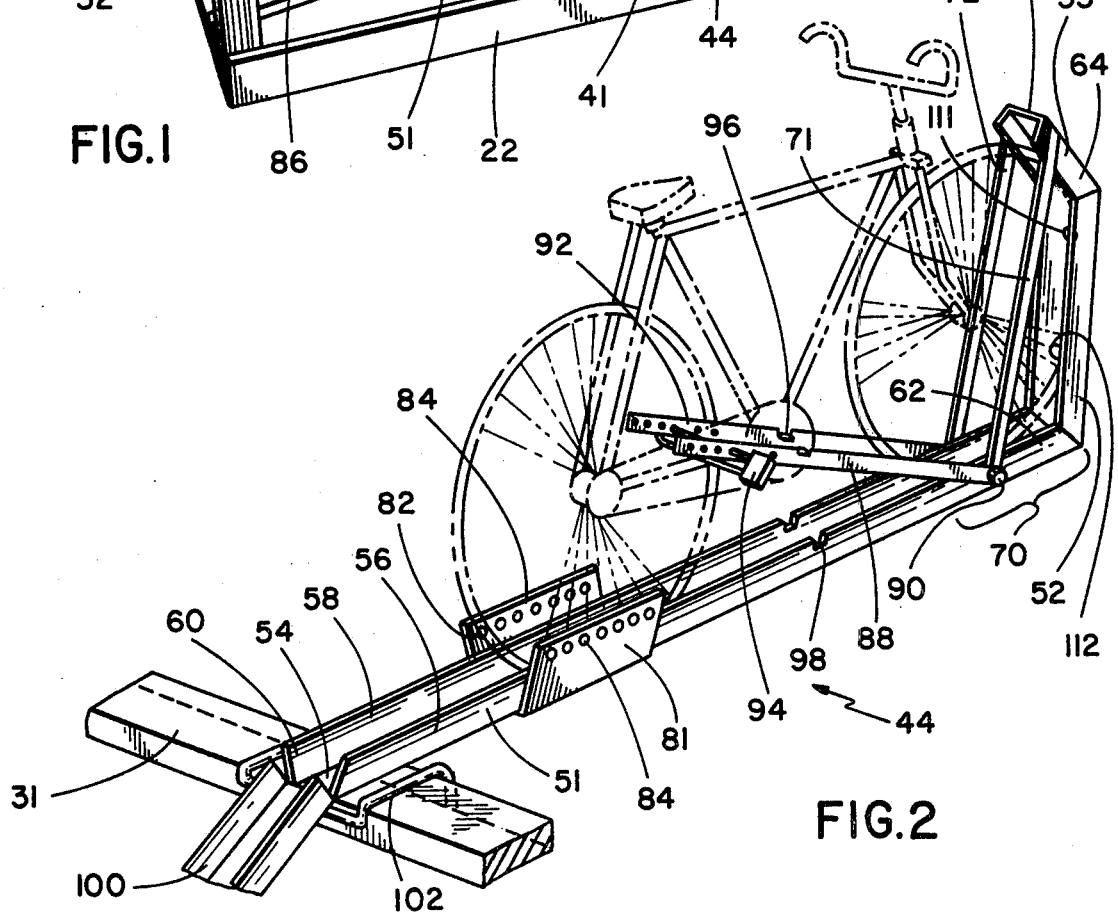
FIG. 2 is an elevational perspective view of one of the bicycle receiving channel members disposed in one of the two arrays of channel members forming the bicycle storage rack shown in FIG. 1.

Typically the plates 81 and 82 are defined by side walls of a short segment of a larger sized piece of channel iron which is fitted about and beneath the first segment 51 and welded thereto as shown in FIG. 2.

In addition to, or in place of, the plates 81 and 82, the means for securing and locking a bicycle to the channel member may include a locking strap 88 as shown in FIG. 2. The locking strap 88 is pivotally connected to the first segment 51 near the end 62 thereof such as by a pin 90 which also serves to connect the bars 71 and 72 to the first segment 51. The other or free end of the locking strap has a plurality of holes 92 therein each adapted to receive the leg of a padlock 94 which is inserted through one of the holes 92 for securing the padlock in a position adjacent to or about a portion of the frame and/or against the inside of the rear wheel.

In the illustrated embodiment, a second locking strap 96 is provided, with the pair of straps 90 and 96 being adapted to straddle a bicycle received on the first segment 51 such that the padlock 94 can extend through both straps 90 and 96 as shown in FIG. 2. Also each strap 90 and 96 has an inwardly extending ear or tab which rests in a notch 98 in the side wall 56 or 58 of the first segment 51 when the channel member 44 does not have a bicycle therein.

The notch 98 and tab prevent the locking strap 90 or 96 from falling down which would be undesirable in the upper deck or array 42 of channel members 44. Thus, in an at rest position, the locking straps 90, 96 are juxtaposed the first segment 51 and are pivotable upwardly to a locking position straddling a wheel and/or frame of a bicycle.

To facilitate positioning of a bicycle in the upper deck or array 42 the bicycle storage rack 10 also includes a movable trough member 100 which has means in the form of a hook assembly 102 on the like for catching onto the cross member 31 at the open end 60 of the first segment 51 of a channel member 44 in the upper array 42 as shown in FIG. 2. The trough member 100 is detachable from the framework 11 and provides an inclined track between ground level and one of the elevated channel members 44 in the upper array 42 for rolling a bicycle up and onto the elevated channel member 44.

Although the channel members 44 can all be identical, in the illustrated embodiment some channel members 44 differ slightly from other channel members 44 for the purpose of positioning the second segments 52 of all the channel members 44 substantially parallel (generally flush) with an adjacent wall to facilitate securement-bolting-of the channel members 44 to the wall, such as a cement block wall in a high rise building. The difference is in the angle at which the first and second segments 51 and 52 of each channel member 44 are welded together.

Thus, all the channel members 44 which extend horizontally to the cross members 33 and 36 have the first and second segments 51 and 52 thereof secured together at approximately a 90° angle; those which extend upwardly to the cross member 34 have first and second segments 51 and 52 welded together at an obtuse angle; and those which extend downwardly to the cross member 35 have first and second segments 51 and 52 welded together at an acute angle.

In a prototype built, the framework 11, was made of wood, i.e., two by fours, and the metal channels members 44 were secured to and between the various wooden cross members 31-36. However, it is desirable to fix the channel members more securely such as to a cement block wall in a building. For this reason, in one preferred design of the storage rack 10, all of the second segments 52 extend generally vertically. Also, each second segment 52 may be provided with mounting holes 111 and 112 as shown in FIG. 2 for receiving mounting bolts therethrough for securing each channel member 44 to a cement block wall, if desired. Framework 11 can be of metal.

From the foregoing description it will be apparent that the bicycle storage rack 10 has a number of advantages, some of which are inherent in the bicycle storage rack 10 and others of which are set forth below:

1. It is compact and can fit in a 5 to 6 feet cubical space.

2. The channel members 44 are designed to accommodate a theft proof lock that locks bicycle wheels and frame together and to the channel member 44.

3. The rack 10 allows each individual bicycle to be removed without disturbing the security of the other bicycles.

4. Each rack 10 designed to hold a plurality, e.g., ten, bicycles is safe, strong, self contained and needs no additional support; and each rack 10 or banks of racks 10 can be installed in any place that is reasonably level, to fit individual needs.

5. The racks are relatively simple and inexpensive to manufacture and install.

6. Additionally, the racks 10 can obviate damage to hallways, elevators, doors and apartments of buildings caused by bicycles which are transported to and from, and stored in, individual apartments for safety, by enabling the bicycles to be stored in a secure, safe, ground floor storage area.

Also from the foregoing description it will be apparent to those skilled in the art that obvious modifications and variations can be made to the bicycle storage rack 10 without departing from the spirit or scope of the invention. Accordingly the scope of the invention is only to be limited as necessitated by the accompanying claims.

I claim:

1. A bicycle storage rack comprising at least one bicycle receiving channel member including a first, elongate, generally horizontally disposed, segment, a second generally upright segment extending upwardly from one end of said first segment, and a rigidly mounted third segment extending angularly upwardly from the upper end of said second segment and above said first segment, said segments being arranged to form between the ends thereof a rigid continuous bicycle receiving trough which extends generally horizontally, then upwardly and finally in a reverse direction over a portion of the generally horizontal section of the trough, said trough being adapted to receive bicycle wheels therein with a portion of said first segment adjacent said one end of said first segment together with said second segment and said third segment forming a bicycle wheel receiving and retaining formation preventing removal of the bicycle by upward movement of the bicycle wheel, with said third segment extending above a portion of one wheel of said bicycle, and said channel member further includes a locking strap for securing a bicycle to said channel member said locking strap being pivotally secured at one end to said first segment, and which has at least one hole therein near the other, free end thereof and which is movable between a generally horizontal position juxtaposed with said first segment and an angularly upwardly extending position where a leg of a padlock can be inserted through said hole.

2. The bicycle storage rack according to claim 1 including a pair of bars which extend between said first segment and said third segment, each bar being fixed to the first and third segments on one side of said channel member and being spaced from said second segment, said bars further defining said bicycle wheel receiving and retaining formation.

3. The bicycle storage rack according to claim 1 wherein said securing means includes a pair of plates fixed to and extending upwardly from said first segment on either side of said channel member and closer to the end of said first segment opposite said one end of said first segment so as to be in position to straddle the other wheel of a bicycle received in said channel member, and each of said plates having at least one hole therein generally aligned with a hole in said other plate, said holes being adapted to receive therethrough one leg of a padlock which may also extend through the other wheel for locking the bicycle to said channel member.

4. The bicycle storage rack according to claim 3 wherein each of said plates has a plurality of holes, each hole in one plate being aligned with a like hole in said other plate.

5. The bicycle storage rack according to claim 1 wherein said locking strap has a plurality of holes therein.

6. The bicycle storage rack according to claim 1 including a second locking strap substantially identical to said first locking strap and pivotally secured at one end to said first segment opposite the pivot connection of said first locking strap to said first segment.

7. The bicycle storage rack according to claim 1 including a plurality of said channel members, all of said channel members being arranged in a parallel spaced array with alternate ones of said channel members having a first segment which is mounted so as to extend angularly upwardly toward said second segment, whereby said second segments are vertically staggered and whereby the said one end of said first segment of each alternate channel member is situated above the said one end of said first segment of the adjacent channel members thereby permitting adjacent channel members to be closely spaced a distance less than the distance between the handle grips on a bicycle and such that the handle grips of a bicycle received in one channel member are disposed above or beneath the handle grips of bicycles received in adjacent channel members.

8. The bicycle storage rack according to claim 7 including a framework and a plurality of additional channel members mounted to said framework in a parallel spaced array above said first array with alternate ones of said plurality of additional channel members being configured and mounted in a manner similar to the configuration and mounting of said alternate channel members of said first plurality of channel members so that said second segments of said plurality of additional channel members are vertically staggered thereby to facilitate close spacing between adjacent channel members of said plurality of additional channel members.

9. The bicycle storage rack according to claim 8 including an elongate, movable trough member which has catch means adjacent one end thereof for detachably fixing said trough member to said framework adjacent the free end of the first segment of one of said elevated channel members in said plurality of additional channel members thereby to provide an inclined track between ground level and the upper level of one of said elevated channel members for rolling a bicycle up and onto one of said elevated channel members.

* * * * *